March 31, 1970  R. STRUB  3,503,207
CLOSED CYCLE CO$_2$ GAS TURBINE POWER PLANT WITH PARTIAL
CONDENSATION OF THE WORKING SUBSTANCE
PRIOR TO EXPANSION THEREOF
Filed July 29, 1968  2 Sheets-Sheet 1

Inventor:
Rene Strub
BY Pennie, Edmonds,
Morton, Taylor and Adams
ATTORNEYS

March 31, 1970  R. STRUB  3,503,207
CLOSED CYCLE CO$_2$ GAS TURBINE POWER PLANT WITH PARTIAL
CONDENSATION OF THE WORKING SUBSTANCE
PRIOR TO EXPANSION THEREOF
Filed July 29, 1968  2 Sheets-Sheet 2

Inventor:
Rene Strub
BY Pennie, Edmonds,
Morton, Taylor and Adams
ATTORNEYS

United States Patent Office 3,503,207
Patented Mar. 31, 1970

3,503,207
CLOSED CYCLE CO$_2$ GAS TURBINE POWER PLANT WITH PARTIAL CONDENSATION OF THE WORKING SUBSTANCE PRIOR TO EXPANSION THEREOF
René Strub, Winterthur, Switzerland, assignor to Sulzer Brothers Limited, Winterthur, Switzerland, a Swiss company
Filed July 29, 1968, Ser. No. 748,553
Claims priority, application Switzerland, July 27, 1967, 10,680/67
Int. Cl. F01k 25/10, 19/00; F01n 3/04
U.S. Cl. 60—36        7 Claims

ABSTRACT OF THE DISCLOSURE

There is disclosed a closed cycle CO$_2$ gas turbine power plant in which the CO$_2$ is compressed in plural stages and then expanded in plural stages with heat being supplied thereto between two expansion stages, and in which moreover at an intermediate stage of compression the flow of working substance is divided into two streams. One stream undergoes further compression while the other undergoes partial condensation and pumping to higher pressure before being reunited with the first stream, as further compressed, prior to passage through the high pressure expansion stage. A part of the stream so condensed is recombined, prior to pumping to higher pressure, with the first stream at an appropriate pressure level therein, with a resultant saving in compressor power requirements.

The present invention pertains to a closed cycle gas turbine power plant employing CO$_2$ as the working substance in which part of the CO$_2$ flow is condensed prior to a first expansion, with the remainder of the flow, in a high pressure turbine. Plants of the type to which the invention pertains include at least two expansion stages on separate shafts and operate in conjunction with a nuclear reactor or other suitable heat source. The gas is compressed in at least two compressors with intermediate cooling between them and is expanded in at least two series-connected turbines with heating of the working substance between those turbines. A portion of the working substance is withdrawn from the main cycle or flow path, is condensed, increased in pressure, and is then returned to the main flow path, the supply of heat from the external source being effected at least in part to working substance which has undergone partial expansion.

It has heretofore been proposed to operate gas turbine plants according to a method in which a part of the working substance is branched off from the main flow path at high pressure. The working substance so branched off is cooled and liquefied. In such a process, the liquefied working substance can be raised in pressure, for example by means of a pump, and then heated and returned to the main flow path. This method of operation brings the process close to that of a Carnot cycle. It has further been proposed to transform into electrical energy the heat of a nuclear reactor by means of a closed cycle gas turbine plant in which CO$_2$, functioning as the reactor coolant, also serves as the working substance in the gas turbine plant. Application to the CO$_2$ of the heat exteriorly generated, i.e. in the reactor, is preferably effected at an intermediate pressure level in the gas turbine plant, in that the CO$_2$ (which passes through the reactor for extraction of heat therefrom) has been only partially expanded in a high pressure turbine. Such a mode of operation has the advantage that the coolant passages of the reactor need withstand only low pressures.

In large plants in which the quantity of working substance flowing past a given point per unit time is large, difficulty is often encountered in the lay-out of the high pressure compressor because of the high power consumption thereof at such large flow rates.

It is therefore an object of the present invention to reduce the compressor power requirements in gas turbine power plants of the type above-described. In accordance with the invention, a part of the condensed fraction is returned to the flow path of the gaseous working medium and is vaporized prior to the increased in pressure which follows for the gaseous working medium. By means of the invention the useful output of the plant is increased and the efficiency thereof is preserved, notwithstanding somewhat reduced heat recover.

Advantageously, the return or re-injection of the condensed CO$_2$ working substance is effected by means of a pump or ejector at the location where the CO$_2$ to be condensed is branched off. The lossse of pressure undergone by the fraction which becomes liquefied in its passage through the condenser are compensated by means of this pump.

If however a portion of the condensate is returned to the flow path of the gaseous working medium at a point of suitable pressure, the circulating pump itself can be dispensed with. It is also possible to control the amount of condensate returned, either in dependence on the speed of rotation of the high pressure shaft or in dependence on the difference in pressure between that existing in the condensate line and the point of return into the flow path of the gaseous working medium.

Moreover, if the portion of the condensate not re-injected is raised in pressure to one of the intermediate pressure levels of the plant, by means of a pump coupled to the low pressure shaft, there may be employed for this purpose a low speed half-axial pump of high efficiency. It can also be thermodynamically advantageous to effect part of the application of exterior heat in the high pressure part of the cycle, optionally with the assistance of an intermediate heat exchange medium such as liquid sodium, if the heat source is a reactor.

BRIEF DESCRIPTION OF THE DRAWINGS

The invention will now be further described in terms of a number of non-limitative exemplary embodiments thereof and with reference to the accompanying drawings in which.

Figure 1:
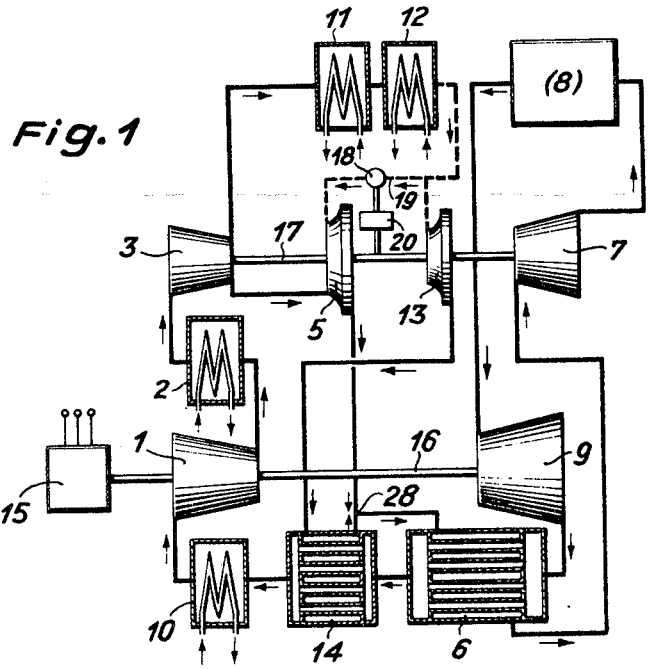
FIGS. 1 to 4 are diagrams of gas turbine plants employing CO$_2$ as the working substance in accordance with the invention. Similar elements of structure are identified by the same reference characters in all figures.

In the drawing, "lines" or pipes (i.e. conduits) carrying gaseous CO$_2$ are shown as single lines on the paper. Conduits carrying condensate are shown as dashed lines, while signal conduits are shown as dot-dash lines.

DESCRIPTION OF THE PREFERRED EMBODIMENTS

Referring to FIG. 1, the low pressure compressor 1 is coupled to the low pressure shaft 16 which drives the electric generator 15 constituting the useful load borne by the plant. The compressor 1 draws cold expanded gas from the re-cooler 10 and raises it to an intermediate pressure. The gas then passes through an intercooler 2 to the intermediate pressure compressor 3 which is driven from the high pressure turbine 7 via shaft 17. A high pressure compressor 5 and a condensate pump 13 are also disposed on this shaft. The condensate pump can however be driven from the low pressure shaft as already indicated. At the outlet of the intermediate pressure compressor 3, the gas is divided into two approximately equal partial streams or fractions. One flows through the pre-cooler 11 and condenser 12 to the pump 13 where it is raised to the highest pressure of the plant. The flow circuit is so disposed that the condensate emerging from the condenser 12 is raised in the pump 13 above critical pressure, prior to passage through a heat exchanger or regenerator 14. In this regenerator the condensate is raised in temperature by absorption of heat from expanded working substance flowing to the left in the drawing before rejoining the other partial stream at the junction point 28.

The second partial stream flows from the outlet of the compressor 3 directly into the high pressure compressor 5 where it is raised to its final pressure and is then delivered to the junction point 28.

From the junction point 28 the entire gas stream flows to the right through the heat exchanger or regenerator 6 wherein it is heated by the expanded gas coming from the turbine 9 and flowing toward the return cooler 10. As so heated, the entire gas stream passes for a first expansion to the high pressure turbine 7.

In the nuclear reactor 8 which follows, the $CO_2$ is heated before being expanded in the turbine 9 to the initial pressure. It is in this expansion that the useful output work is done. In its passage through the regenerators 6 and 14 the expanded gas is returned to its initial condition upstream of the low pressure compressor 1. In the return cooler 10, as in the intercooler 2, pre-heater 11 and condenser 12, heat is dissipated to the exterior with the help of a coolant such as water.

Figure 2:
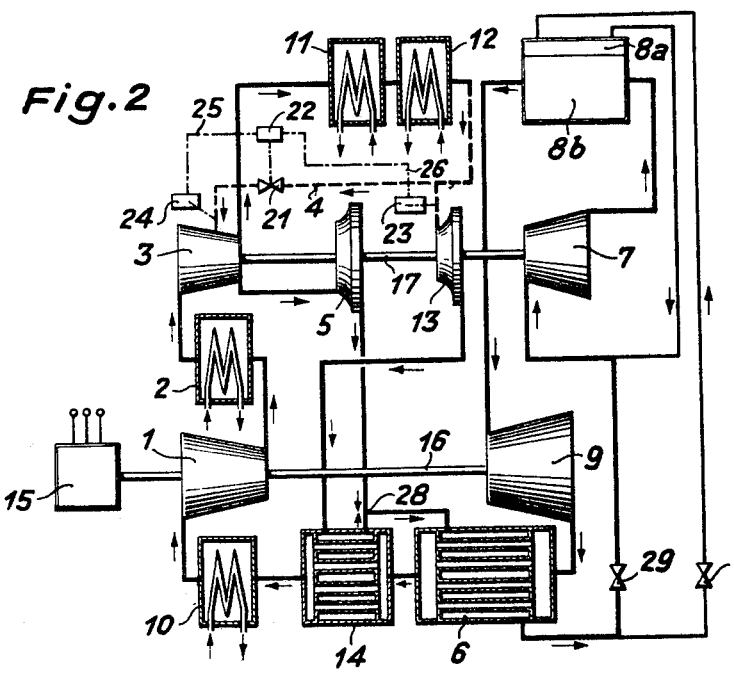

As shown in FIG. 2, the heat exchanger or reactor 8 may be subdivided into high and low pressure portions 8a and 8b, so that the application of heat to the working substance occurs in part upstream of the high pressure turbine 7. To this end, at least part of the gas compressed to final pressure is fed for further heating to the high pressure fraction 8a of the reactor before passing into the turbine 7. To control the size of the fraction so passed through the reactor part 8a, suitable flow control devices 29 and 29a are provided. These can be on-off valves operated by hand, if the entire gas stream is to be heated in the part 8a. The devices 29 and 29a may however take the form of regulating or controlling devices, e.g. continuously adjustable valves, adjusted in opposite senses in response to a temperature measurement made at the outlet of the high pressure fraction 8a of the reactor by means of a temperature measurement device not shown.

Figure 3:
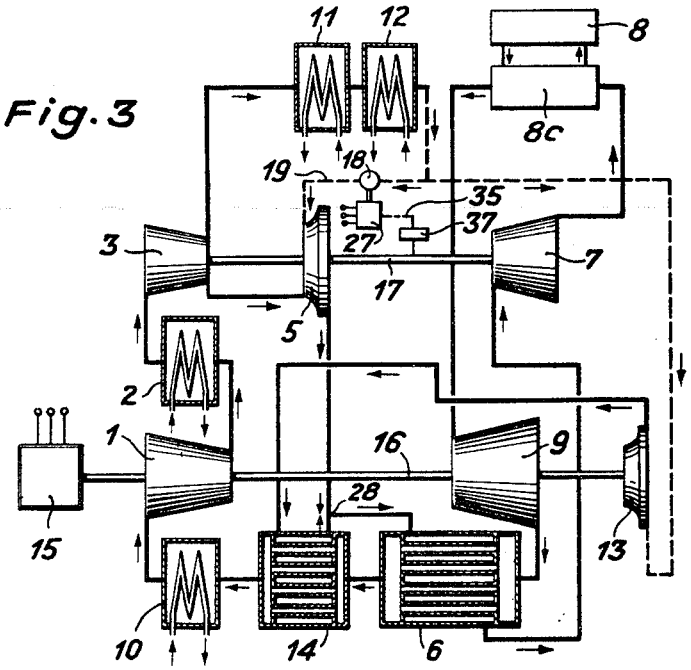

The basic flow circuit of the embodiment of FIG. 3 differs from those FIGS. 1 and 2 firstly in that the pump 13 is disposed on the low pressure shaft 16, thus permitting the use of a highly efficient pump as already indicated. A further departure in the embodiment of FIG. 3, by reference to FIGS. 1 and 2, resides in the fact that the $CO_2$ circuit is heated indirectly from the reactor by means of a heat exchange medium distinct from the reactor coolant proper, which latter may for example be liquid sodium. This intermediate heat exchange medium delivers its heat to the $CO_2$ in a heat exchanger 8c. Heat transfer from the reactor to the $CO_2$ by means of an intermediate heat exchange medium is advantageous if the pressure to which the reactor coolant proper is to be exposed must be held to low levels. Consequently, the modification of FIG. 3 can advantageously be used when, as in FIG. 2, supply of heat from the outside is to be made to the $CO_2$ after the latter has been raised to its final pressure and prior to first expansion.

In accordance with the invention, a portion of the condensate is branched off between the condenser 12 and the pump 13. The portion so branched off may, as shown in FIG. 1, be returned to the main flow circuit at the inlet to the high pressure compressor 5 by means of a circulating pump 18 driven by a coupling 20 from the high pressure shaft 17, the flow through the pump being via the line 19. The condensate so returned will be vaporized in the compressor 5, with reduction in the power consumption of that compressor. The portion of the condensate so returned will vary automatically with change in the speed of rotation of the high pressure shaft 17.

By reason however of the natural fall in pressure of the condensate in its passage along pre-cooler 11, condenser 12 and line 4 (FIG. 2), it is also possible to return it to an intermediate stage of the intermediate pressure compressor 3 and thereby to dispense with the supplementary pump 18. For control of the amount of condensate returned, there is provided in FIG. 2 a flow control device 21 which is adjusted by means of a differential controller 22 in response to the pressure measuring devices 23 and 24, measuring pressure in the condensate line at the input to pump 13 or at the re-injection point in the compressor 3. Signal lines 25 and 26 are provided for this purpose.

In the embodiment of FIG. 3 a circulating pump 18 is driven by an electric motor 27, whose speed of rotation is adjusted via signal line 35 in response to the output signal from a tachometer 37 on the high pressure shaft 17 in order to adjust the fraction of condensate returned.

Figure 4:
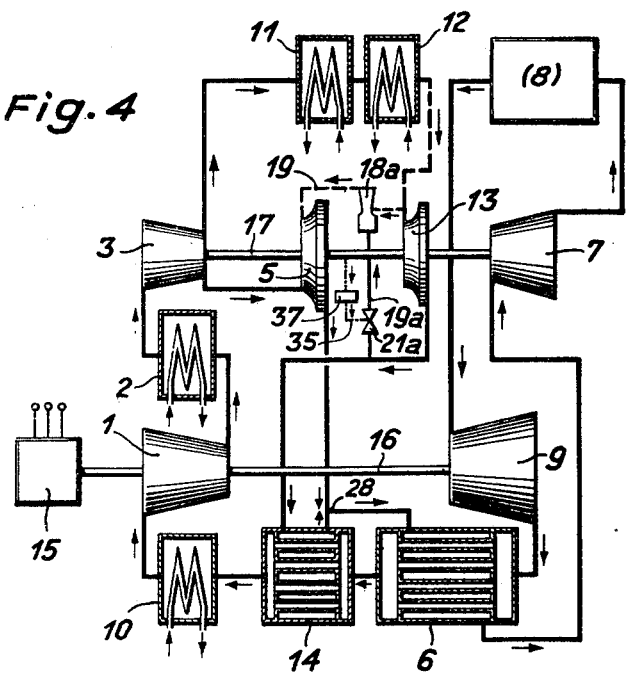

The mode of operation of the embodiment of FIG. 4 corresponds basically to that of FIG. 1. The partial return of the condensate at the inlet to the high pressure compressor 5 is here effected with the help of an ejector 18a which replaces the pump 18 of FIG. 1. Motive power for the ejector is supplied by relatively cold $CO_2$, withdrawn via a line 19a from the outlet of pump 13. For control of the amount of working substance returned to the compressor 5, there is provided a flow control device 21a in the line 19a. Its degree of opening is adjusted under control of the tachometer 37 via the signal line 35. Since the condensate injected into the compressor 5 serves a cooling function, it is advantageous in the embodiment of FIG. 4 to employ the relatively cold $CO_2$ from the pump 13 for driving the ejector 18a. To effect, in accordance with the invention, cooling of the working substance which is to be compressed in the compressor 5 and thus to reduce the power requirements of the high pressure compression step, it is sufficient to return some 3 to 10% of the condensed working substance to the compressor 3 or 5.

The flow control devices 21 and 21a of FIGS. 2 and 4 may take the form of continuously adjustable valves with actuators thereon, responsive to the signals supplied to those devices as hereinabove described.

While the invention has been described hereinabove in terms of a number of preferred embodiments, the invention itself is not limited thereto but, rather, comprehends all modifications of and departures from those embodiments properly falling within the spirit and scope of the appended claims.

I claim:

1. A closed cycle gas turbine power plant employing $CO_2$ as working substance, said plant comprising high and low pressure turbines on high and low pressure shafts, intermediate and low pressure compressors coupled to said high and low pressure shafts respectively, a heater, a high pressure compressor, a condenser, a condensate pump, conduit means connecting said high pressure turbine, heater, low pressure turbine, low pressure compressor, and intermediate pressure compressor together for flow of working substance therethrough, conduit means connecting said condenser and condensate pump in series between the outlet of said intermediate pressure compressor and high pressure turbine, a high pressure compressor connected between said intermediate pressure compressor and high pressure turbine, and supplementary pumping means connected between the outlet of said condenser and a point upstream of said high pressure compressor.

2. A power plant according to claim 1 in which said supplementary pumping means are connected between said condenser and the inlet to said high pressure compressor.

3. A power plant according to claim 1 wherein said supplementary pumping means comprise an ejector energized with working substance delivered by said condensate pump.

4. A power plant according to claim 1 including means to vary the amount of working substance delivered by said supplementary pumping means.

5. A power plant according to claim 4 in which the amount of working substance delivered by said supplementary pumping means is varied in dependence on the speed of rotation of the high pressure shaft.

6. A power plant according to claim 4 in which the amount of working substance delivered by said supplementary pumping means is varied in dependence on the pressure differential between the points of connection of said supplementary pumping means to said condenser and to said point upstream of said high pressure compressor.

7. A power plant according to claim 1 wherein said condensate pump is coupled to said low pressure shaft.

References Cited

UNITED STATES PATENTS 2,472,846  6/1949  Nettel et al.
3,205,664  9/1965  Nettel _____ 60—70

MARTIN P. SCHWADRON, Primary Examiner
ROBERT R. BUNEVICH, Assistant Examiner

U.S. Cl. X.R.

60—59, 95